(12) United States Patent
Park

(10) Patent No.: US 12,038,788 B2
(45) Date of Patent: Jul. 16, 2024

(54) DISPLAY DEVICE

(71) Applicant: SAMSUNG DISPLAY CO., LTD., Yongin-si (KR)

(72) Inventor: Raesun Park, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 204 days.

(21) Appl. No.: 17/852,626

(22) Filed: Jun. 29, 2022

(65) Prior Publication Data
US 2023/0136310 A1 May 4, 2023

(30) Foreign Application Priority Data
Nov. 2, 2021 (KR) .......... 10-2021-0149163

(51) Int. Cl.
G06F 1/16 (2006.01)

(52) U.S. Cl.
CPC .......... G06F 1/1656 (2013.01); G06F 1/1616 (2013.01)

(58) Field of Classification Search
CPC .......... G09G 1/007; G09G 3/001; G09G 3/36; G09G 3/20; G09G 3/3607; G09G 3/207; G09G 3/2092; G09G 3/2096; G09G 5/006; G09G 3/28; G06F 3/147; G06F 1/656; G06F 1/616; G06F 1/162; G02B 27/00; G02B 27/02; G02B 6/4486; G02F 2201/50; G02F 1/133305; G02F 1/13338; G02F 1/133308; G02F 1/1335; G02F 2201/123; G02F 2202/09; G09F 9/301; G09F 9/35; G09F 9/335
USPC .......... 345/156, 166, 173, 1.1, 4, 30, 32, 39
See application file for complete search history.

(56) References Cited

FOREIGN PATENT DOCUMENTS

| EP | 3340328 A1 * | 6/2018 | .......... G06F 1/1641 |
| KR | 10-2016-0130921 | 11/2016 | |
| KR | 10-2078679 | 2/2020 | |
| KR | 10-2020-0069527 | 6/2020 | |

OTHER PUBLICATIONS

JunHo, Yeo, Flexible Display Device, Jun. 27, 2018, Clarivate Analytics, pp. 1-38 (Year: 2018).*

* cited by examiner

Primary Examiner — Antony M Paul
(74) Attorney, Agent, or Firm — F. Chau & Associates, LLC

(57) ABSTRACT

A display device includes a display panel including a display area, a first area spaced apart from the display area, and a second area disposed between the display area and the first area. An optical layer is disposed on the display panel and extends from the display area to a portion of the second area. A protective member includes a first protective layer disposed on the display panel in the first area and a second protective layer disposed on the display panel in the second area and having a thickness less than a thickness of the first protective layer.

20 Claims, 12 Drawing Sheets

DISPLAY DEVICE

This application claims priority under 35 U.S.C. § 11.9 to Korean Patent Application No. 10-2021-0149163, filed on Nov. 2, 2021 in the Korean Intellectual Property Office, the disclosure of which is incorporated by reference in its entirety herein.

1. TECHNICAL FIELD

Embodiments relate to a display device. More particularly, embodiments relate to a foldable display device.

2. DISCUSSION OF RELATED ART

A foldable display device that can be unfolded or folded has generated increasing interest in the electronics industry based on features such as increased portability and convenience. However, when the foldable display device is unfolded or folded, a repulsive force may be generated. The repulsive force may cause damage to a display panel and/or a window included in the foldable display. For example, a crack may occur in the display panel or the window may be lifted.

SUMMARY

Embodiments of the present inventive concept may provide a display device with increased display quality.

According to an embodiment of the present inventive concept, a display device includes a display panel including a display area, a first area spaced apart from the display area, and a second area disposed between the display area and the first area. An optical layer is disposed on the display panel and extends from the display area to a portion of the second area. A protective member includes a first protective layer disposed on the display panel in the first area and a second protective layer disposed on the display panel in the second area and having a thickness less than a thickness of the first protective layer.

In an embodiment, the protective member may be spaced apart from the optical layer and does not directly contact the optical layer.

In an embodiment, the display device may further include an adhesive layer disposed between the display panel and the optical layer.

In an embodiment, the thickness of the second protective layer may be less than a thickness of the adhesive layer.

In an embodiment, the second protective layer may directly contact the adhesive layer.

In an embodiment, the second protective layer may directly contact the first protective layer.

In an embodiment, the second protective layer may cover the second area and the second area does not include an exposed surface.

In an embodiment, the second protective layer may include a same material as the first protective layer.

In an embodiment, the protective member may include at least one material selected from a group consisting of an acrylic resin and a urethane-based resin.

According to an embodiment of the present inventive concept, a display device may include a display panel including a display area, a first area spaced apart from the display area, and a second area disposed between the display area and the first area. An optical layer is disposed on the display panel and extends from the display area to a portion of the second area. A protective member includes a first protective layer disposed on the display panel in the first area, a second protective layer disposed on the display panel in the second area and a protective pattern protruding upwardly from the second protective layer and spaced apart from the optical layer.

In an embodiment, the protective pattern may have a rectangular shape or a trapezoidal shape.

In an embodiment, the protective pattern may include a first protrusion, a second protrusion, and a third protrusion sequentially arranged along a first direction from the first protective layer towards the optical layer.

In an embodiment, a thickness of the second protrusion is greater than a thickness of the first protrusion and a thickness of the third protrusion is greater than a thickness of the second protrusion.

In an embodiment, the protective member may be spaced apart from the optical layer and does not directly contact the optical layer.

In an embodiment, the display device may further include an adhesive layer disposed between the display panel and the optical layer.

In an embodiment, the second protective layer may directly contact the adhesive layer.

In an embodiment, the protective pattern may be spaced apart from the adhesive layer and does not directly contact the adhesive layer.

In an embodiment, the second protective layer may directly contact the first protective layer.

In an embodiment, the protective layer may include a same material as the second protective layer.

In an embodiment, a sum of a thickness of the protective pattern and a thickness of the second protective layer is greater than or equal to a thickness of the first protective layer.

The display device may include a display panel, an optical layer disposed on the displays panel, and a protective member. The protective member may be spaced apart from the optical layer. Even if the optical layer is moved by a repulsive force generated when the display device is unfolded or folded, the repulsive force may not be transmitted to the protective member. Accordingly, the protective member may not cause a crack in the display panel and may not lift a window disposed on the protective member. The protective member may, cover the display panel on which the optical layer is not disposed. Accordingly, since the display panel is not exposed by the protective member, generation of static electricity may be reduced. Accordingly, the display quality of the display device may be increased.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF EMBODIMENTS

Figure 1:
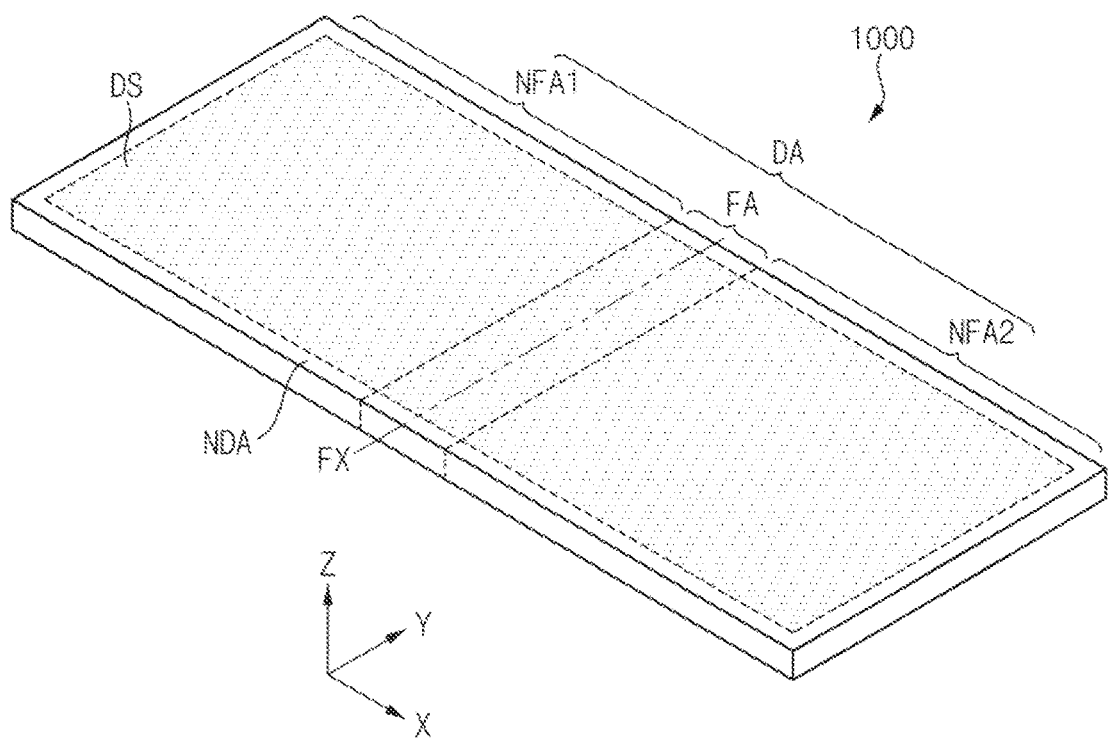
FIG. 1 is a perspective view illustrating an unfolded state of a display device according to an embodiment of the present inventive concept.

The present inventive concept now will be described more fully hereinafter with reference to the accompanying drawings, in which various embodiments are shown. The present inventive concept may, however, be embodied in many different forms, and should not be construed as limited to embodiments set forth herein. Rather, these embodiments are provided so that this disclosure will be thorough and complete, and will fully convey the scope of the present inventive concept to those skilled in the art. Like reference numerals refer to like elements throughout.

Figure 2:
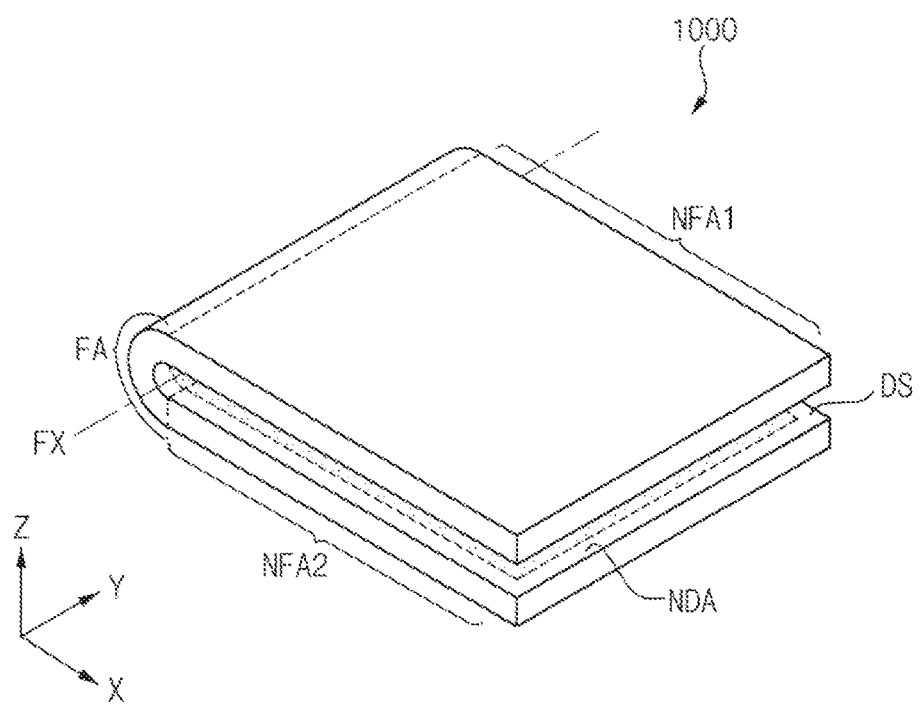
FIG. 2 is a perspective view illustrating a folded state of the display device of FIG. 1 according to an embodiment of the present inventive concept.

FIG. 1 is a perspective view illustrating an unfolded state of a display device according to an embodiment and FIG. 2 is a perspective view illustrating a folded state of the display device of FIG. 1.

Referring to embodiments of FIGS. 1 and 2, a first direction X and a second direction Y intersecting the first direction X may define a plane. For example, in an embodiment, the second direction Y may be perpendicular to the first direction X. The third direction Z may intersect the plane. For example, the third direction Z may be perpendicular to the plane. However, the first to third directions X, Y, Z may cross each other at various different angles. In an embodiment, the first direction X may be referred to as a width direction, the second direction Y may be referred to as a length direction, and the third direction Z may be referred to as a thickness direction. However, embodiments of the present inventive concept are not necessarily limited thereto.

A display device 1000 according to an embodiment may include a display surface DS. In an embodiment, the display surface DS may be a front surface of the display device 1000. The display surface DS may be a surface on which the display device 1000 displays an image. A rear surface of the display device 1000 may not display an image.

The display device 1000 may be a foldable display device. The display device 1000 may be unfolded or folded. For example, an unfolded state of the display device 1000 may be referred to as an unfolding state, and a folded state of the display device 1000 may be referred to as a folding state. The folded state of the display device 1000 may be a state in which a portion of the display device 1000 faces another portion or a state in which a portion forms a predetermined inclination with respect another portion. For example, the folded state of the display device 1000 may be a state in which separate portions of the display surface DS face each other.

The display device 1000 may be divided into a display area DA and a non-display area NDA. The display surface DS may be disposed over the display area DA and the non-display area NDA.

The display area DA may display an image. A pixel may be disposed in the display area DA. The display area DA may be divided into a folding area FA and non-folding areas, such as first and second non-folding areas NFA1, NFA2.

In an embodiment, the folding area FA may be located in a center of the display area DA (e.g., in the first direction X). The folding area FA may be an area in which the display device 1000 is folded when the display device 1000 is folded. The folding area FA may include a folding axis FX. The display device 1000 may be unfolded or folded based on the folding axis FX.

The first and second non-folding areas NFA1, NFA2 may be located on both sides of the folding area FA (e.g., in the first direction X). For example, the first and second non-folding areas NFA1, NFA2 may be adjacent to the non-display area NDA. The non-folding areas may be areas in which the display device 1000 is not folded even when the display device 1000 is folded into the folded state. In an embodiment, the non-folding areas may include a first non-folding area NFA1 and a second non-folding area NFA2 disposed on both sides of the folding area FA.

The non-display area NDA may be disposed around the display area DA (e.g., in the first and/or second directions X, Y). The non-display area NDA may surround at least a portion of the display area DA. The non-display area NDA may not display an image. A driver such as a printed circuit board may be disposed in the non-display area NDA. The driver may be bent toward the rear surface so as not to be viewed in a plan view of the display device 1000.

Figure 3:
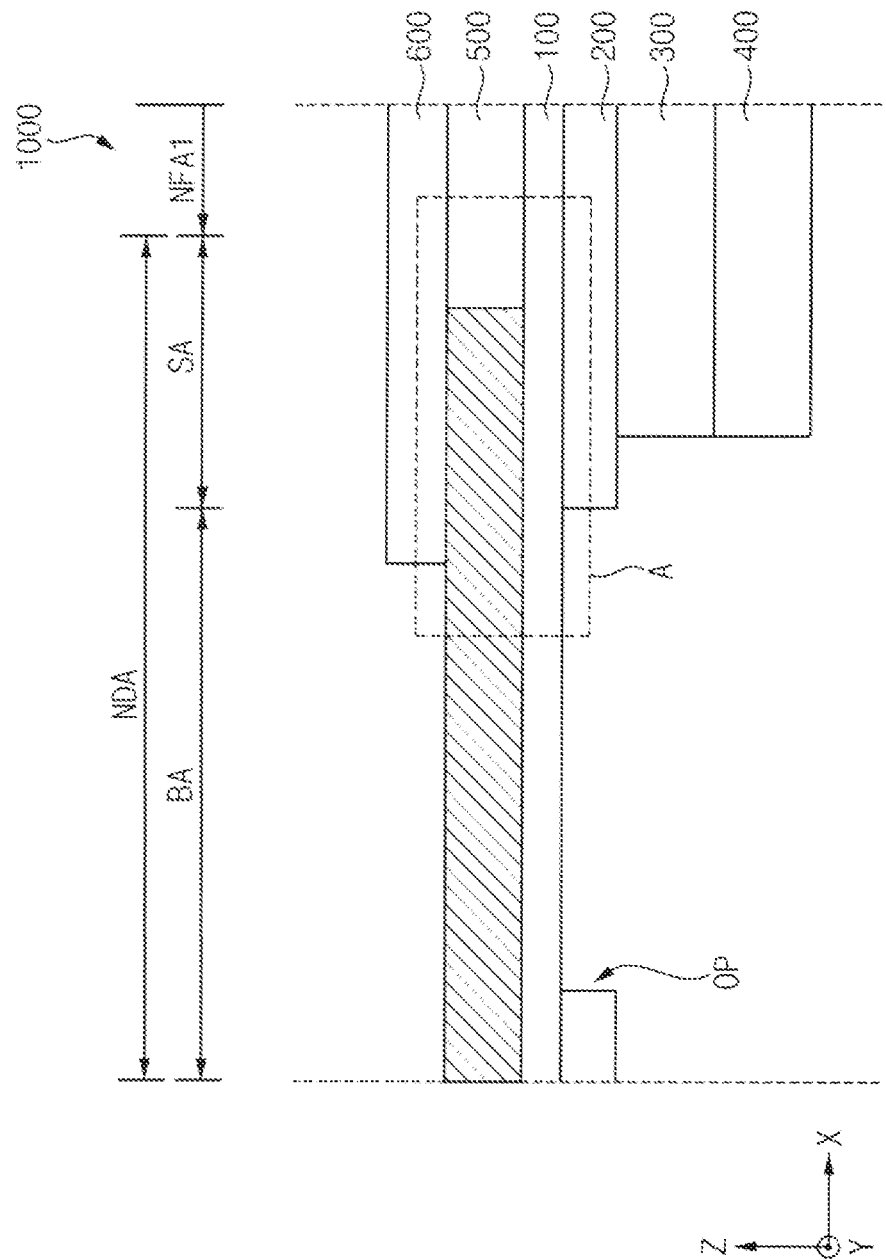
FIG. 3 is a cross-sectional view illustrating a portion of the display device of FIG. 1 according to an embodiment of the present inventive concept.

FIG. 3 is a cross-sectional view illustrating a portion of the display device of FIG. 1.

Referring to an embodiment of FIG. 3, the non-display area NDA may include a first area BA and a second area SA.

The first area BA may be spaced apart from the display area DA. For example, the first area BA may be spaced apart from the non-folding area NFA1 of the display area DA with the second area SA disposed therebetween. The first area BA may be an area bent toward the rear surface of the display surface DS so that the driver is not viewable in a plan view of the display device 1000. The first area BA may be referred to as a bending area.

The second area SA may be disposed between the display area DA and the first area BA. For example, in an embodiment, the second area SA may be immediately adjacent to the non-folding area NFA1 of the display area DA. The second area SA may be a non-bending area. The second area SA may be referred to as a flat area.

The display device 1000 may include a display panel 100, a protective film 200, a buffer member 300, a support member 400, an optical member 500, a protective member BPL, and a window 600.

The display panel 100 may include a display area DA and a non-display area NDA. For example, the display panel 100 has a display area DA including a folding area FA and non-folding areas, such as first and second non-folding areas NFA1, NFA2 and a non-display NDA area including a first area BA and a second area SA.

The display panel 100 may display an image in the display area DA. In an embodiment, the display panel 100 may include an organic light emitting display panel, an inorganic light emitting display panel, a quantum dot light emitting display panel, a micro LED display panel, a nano LED display panel, a plasma display panel, a liquid crystal display panel, and the like.

The protective film 200 may be disposed under the display panel 100 (e.g., directly thereunder in the third direction Z). The protective film 200 may distribute stress applied to the display panel 100 when the display panel 100 is folded. The protective film 200 may have an opening OP in the first area BA. For example, the protective film 200 may be cut in the first area BA and may not overlap the first area BA (e.g., in the third direction Z). Accordingly, when the display panel 100 is folded, stress generated in the display panel 100 may be reduced.

In an embodiment, the protective film 200 may be a plastic film. For example, the protective film 200 may include at least one compound selected from polyimide, polyethylene terephthalate, polycarbonate, polypropylene, polyethersulfone, polymethyl methacrylate, triacetyl cellulose, cycloolofin polymer, and the like.

The buffer member 300 may be disposed under the protective film 200 (e.g., directly thereunder in the third direction Z). The buffer member 300 may protect the display panel 100 by buffering an external impact.

The support member 400 may be disposed under the buffer member 300 (e.g., directly thereunder in the third direction Z). The support member 400 may support the display panel 100. The support member 400 may include a metal. In an embodiment, the metal may include invar, which is an alloy of nickel and iron, stainless steel (SUS), titanium, copper, and the like. However, embodiments of the present inventive concept are not necessarily limited thereto. In an embodiment, a plurality of holes overlapping the folding area FA may be formed in the support member 400.

The optical member 500 may be disposed on the display panel 100 in the display area DA. The optical member 500 may extend from the display area DA to at least a portion of the non-display area NDA. In an embodiment, the optical member 500 may extend from the first non-folding area NFA1 to at least a portion of the second area SA. In an embodiment, the optical member 500 may not extend to the first area BA. The optical member 500 may reduce external light reflection of the display device 1000. Also, the optical member 500 may polarize the light emitted by the display panel 100.

The protective member BPL may be disposed on the display panel 100 in the non-display area NDA (e.g., disposed directly above in the third direction Z). The protective member BPL may extend from the first area BA to at least a portion of the second area SA. The protective member BPL may relieve stress applied to the display panel 100 when the display panel 100 is folded. Also, the protective member BPL may protect the display panel 100 from an external impact.

The window 600 may be disposed on the optical member 500 (e.g., in the third direction Z). The window 600 may protect the display panel 100. The window 600 may include a transparent material. Examples of the transparent material may include glass, plastic, and the like.

In an embodiment in which the window 600 includes glass, the glass may be ultra thin glass (UTG). In an embodiment in which the glass is the ultra-thin glass, the glass may be flexible.

In an embodiment, the adhesive layer may be disposed between the optical member 500 and the window 600 (e.g., in the third direction Z), and a window protective layer may be disposed on the window 600 (e.g., in the third direction Z).

The adhesive layer may fix the window 600 on the optical member 500.

The window protective layer may perform functions such as preventing light scattering by the window 600, absorbing external impacts on the window 600, preventing engraving of the window 600, preventing fingerprints of the window 600, and preventing glare by the window 600. The window protective layer may include a transparent polymer film. For example, in an embodiment, the transparent polymer film may include at least one compound selected from polyethylene terephthalate, polyethylene naphthalate, polyethersulfone, polyimide, polyarylate, polycarbonate, polymethyl methacrylate, cycloolefin polymer, and the like.

Figure 4:
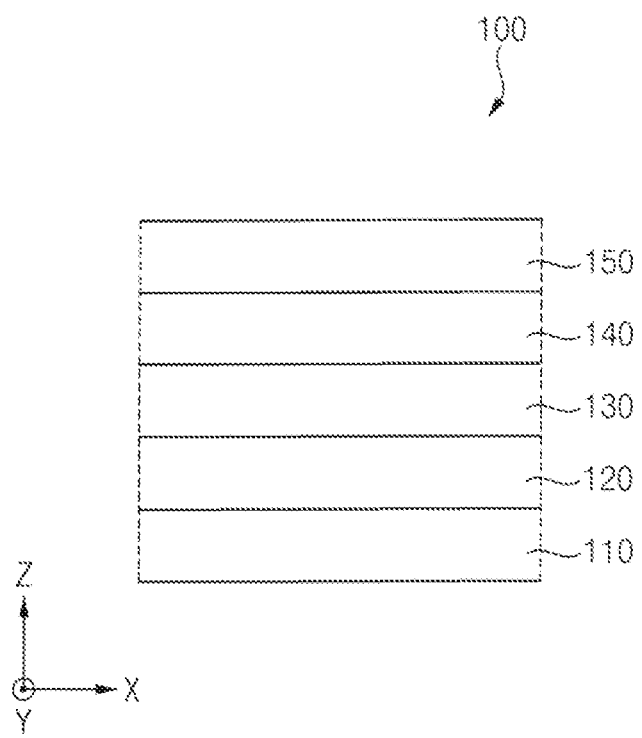
FIG. 4 is a cross-sectional view illustrating a display panel included in the display device of FIG. 3 according to an embodiment of the present inventive concept.

FIG. 4 is a cross-sectional view illustrating a display panel included in the display device of FIG. 3.

Referring to an embodiment of FIG. 4, the display panel 100 may include a substrate 110, a circuit layer 120, a light emitting layer 130, an encapsulation layer 140, and an input sensing layer 150.

The substrate 110 may be a flexible substrate. For example, in an embodiment, the substrate 110 may include a polymer resin such as polyimide. Accordingly, the display panel 100 may be folded.

The circuit layer 120 may be disposed on the substrate 110 (e.g., in the third direction Z). The circuit layer 120 may include a driving member for driving the light emitting layer 130. For example, the circuit layer 120 may include a transistor. The driving member may provide a driving signal to the light emitting layer 130.

The light emitting layer 130 may be disposed on the circuit layer 120 (e.g., in the third direction Z). The light emitting layer 130 may include a light emitting member. The light emitting member may emit light in response to the driving signal. Accordingly, the display panel 100 may display an image.

The encapsulation layer 140 may be disposed on the light emitting layer 130 (e.g., in the third direction Z). In an embodiment, the encapsulation layer 140 may include at least one inorganic encapsulation layer and at least one organic encapsulation layer. In an embodiment, the inorganic encapsulation layer may include at least one compound selected from silicon nitride, silicon oxide, silicon oxynitride, and the like. The encapsulation layer 140 may prevent penetration of moisture and oxygen.

The input sensing layer 150 may be disposed on the encapsulation layer 140 (e.g., in the third direction Z). The input sensing layer 150 may sense a user's input (e.g., a touch of a finger or a pen) and may convert the input into an electrical signal.

Figure 5:
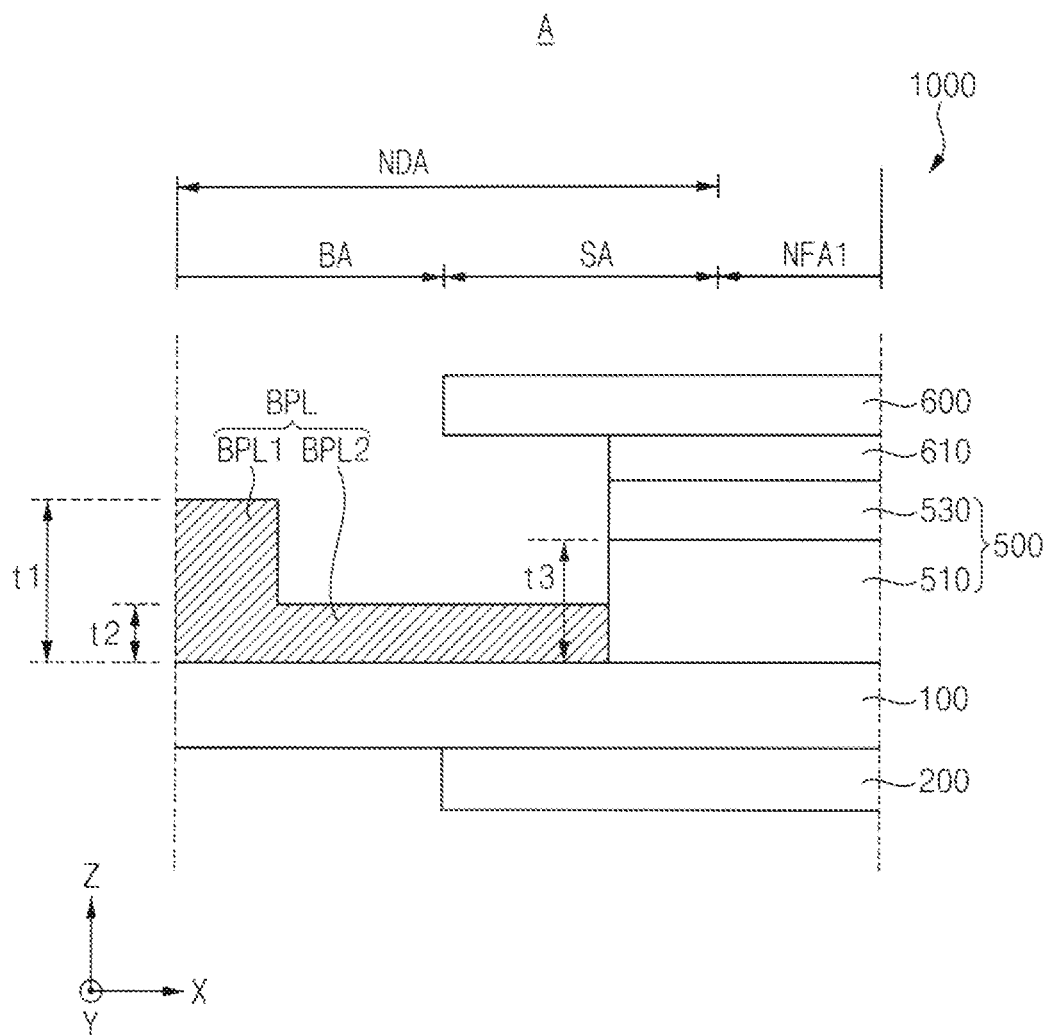
FIGS. 5 and 6 are enlarged cross-sectional views illustrating area 'A' of FIG. 3 according to embodiments of the present inventive concept.
Figure 6:
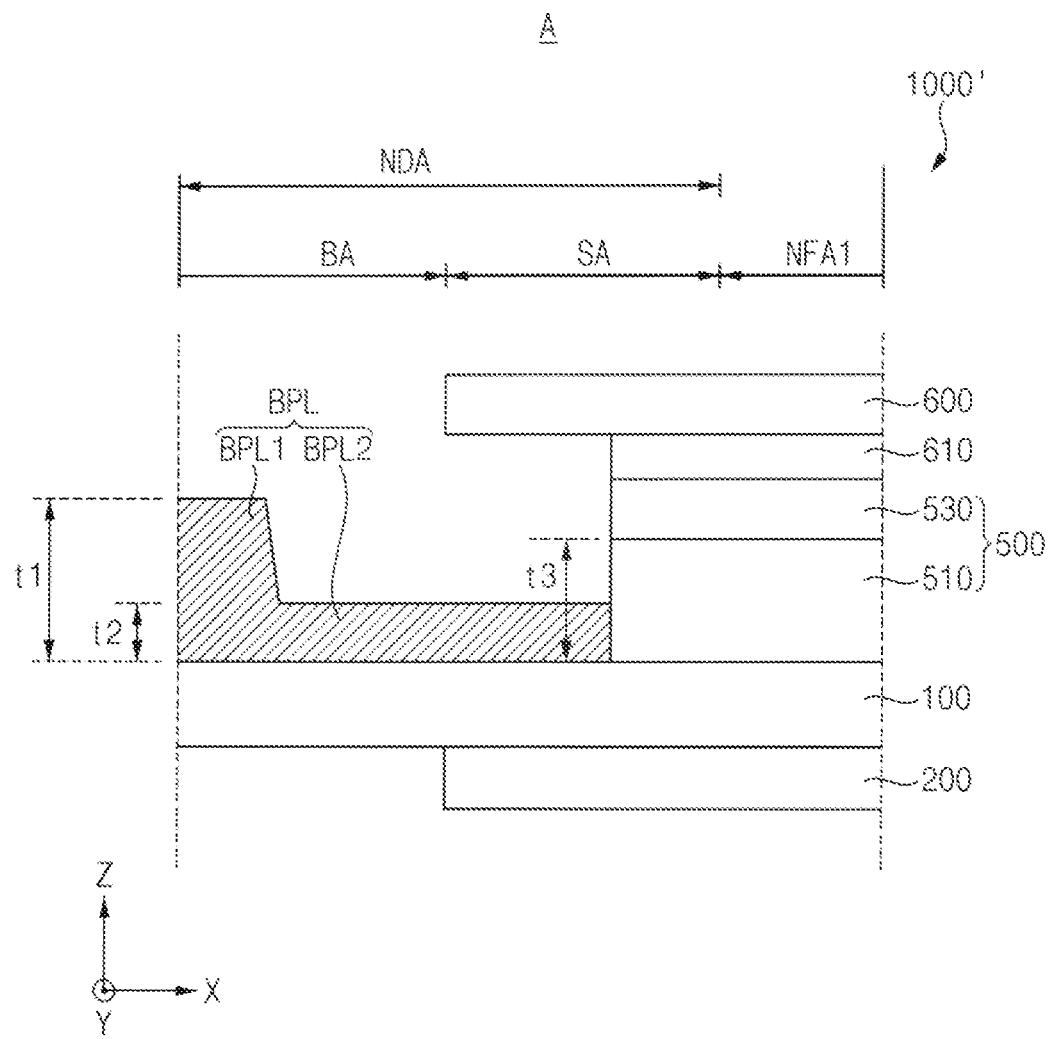

FIGS. 5 and 6 are enlarged views illustrating area 'A' of FIG. 3. FIG. 5 may illustrate an embodiment of area 'A' of FIG. 3, and FIG. 6 may illustrate an embodiment of area 'A' of FIG. 3.

Referring to an embodiment of FIG. 5, the optical member 500 may include an adhesive layer 510 and an optical layer 530. In an embodiment, the protective member BPL may include a first protective layer BPL1 and a second protective layer BPL2.

In an embodiment, the adhesive layer 510 may be disposed between the display panel 100 and the optical layer 530. The adhesive layer 510 may extend from the first non-folding area NFA1 to at least a portion of the second area SA. The adhesive layer 510 may have a third thickness t3 (e.g., length in the third direction Z). For example, in an embodiment, the third thickness t3 may be about 50 micrometers.

The adhesive layer 510 may fix the optical layer 530 on the display panel 100. In an embodiment, the adhesive layer 510 may be an optically transparent adhesive (OCA), an optically transparent adhesive resin (OCR), or a pressure-sensitive adhesive (PSA). A pressure-sensitive adhesive 610 may be further disposed between the optical layer 530 and the window 600 (e.g., in the third direction Z).

The optical layer 530 may be disposed on the display panel 100, and may be disposed on the adhesive layer 510

(e.g., directly on the adhesive layer 510 in the third direction Z). The optical layer 530 may extend from the first non-folding area NFA1 to at least a portion of the second area SA. The optical layer 530 may reduce external light reflection of the display device 1000. Also, the optical layer 530 may polarize the light emitted by the display panel 100.

The first protective layer BPL1 may be disposed on the display panel 100 in the first area BA. The first protective layer BPL1 may have a first thickness t1 (e.g., length in the third direction Z). For example, in an embodiment, the first thickness t1 may be about 80 micrometers.

In an embodiment, the second protective layer BPL2 may be disposed on the display panel 100 in a portion of the second area SA. As shown in an embodiment of FIG. 5, the second protective layer BPL2 may extend to a portion of the first area BA to directly contact the first protective layer BPL1. The second protective layer BPL2 may have a second thickness t2 (e.g., length in the third direction Z). As shown in an embodiment of FIGS. 5-6, the second thickness t2 may be less than the first thickness t1. In an embodiment, the second thickness t2 may be less than or equal to the third thickness t3 of the adhesive layer 510. For example, in an embodiment, the second thickness t2 may be in a range of about 30 micrometers to about 50 micrometers.

A repulsive force generated when the display device 1000 is unfolded or folded may be transmitted to the optical layer 530. For example, in an embodiment, a moving distance of the optical layer 530 by the repulsive force may be about 100 micrometers. In a comparative embodiment in which the protective member BPL directly contacts the optical layer 530, the repulsive force may be transmitted to the protective member BPL. Accordingly, the protective member BPL may cause cracks in the display panel 100 or lift the window 600.

However, in embodiments shown in FIGS. 5-6, the protective member BPL is spaced apart from the optical layer 530 and does not directly contact the optical layer 530. For example, in an embodiment, a distance between the first protective layer BPL1 and the optical layer 530 (e.g., a width of the second protective layer BPL2 in the first direction X) may be in a range of about 100 micrometers to about 130 micrometers. Accordingly, even if the optical layer 530 is moved by the repulsive force, the optical layer 530 may not be moved into direct contact with the first protective layer BPL1. Therefore, the repulsive force may not be transmitted to the first protective layer BPL1.

In an embodiment, the second protective layer BPL2 may be spaced apart from the optical layer 530. For example, since the second thickness t2 of the second protective layer BPL2 is less than the third thickness t3 of the adhesive layer 510, the second protective layer BPL2 is spaced apart from the optical layer 530 (e.g. in the third direction Z) by the distance between the third thickness t3 and the second thickness t2. Therefore, the protective member BPL including the first protective layer BPL1 and the second protective layer BPL2 may not be in direct contact with the optical layer 530. Accordingly, even when the display device 1000 is unfolded or folded, the protective member BPL may not cause a crack in the display panel 100 and may not lift the window 600. Accordingly, the display quality of the display device 1000 may be increased.

In an embodiment, the second protective layer BPL2 may be in direct contact with the adhesive layer 510 and the first protective layer BPL1. For example, the second protective layer BPL2 may cover a portion of the second area SA of the display panel 100. For example, in an embodiment the protective member BPL may cover the entirety of the portion of the second area SA of the display panel 100 on which the optical member 500 is not disposed and the display panel 100 may not have an exposed surface in the second area SA. Accordingly, the protective member BPL may prevent static electricity generated in a portion where the display panel 100 is exposed. Accordingly, the display quality of the display device 1000 may be increased. Also, since the second protective layer BPL2 is in direct contact with the adhesive layer 510, a separation distance between the second protective layer BPL2 and the adhesive layer 510 may not be formed. For example, a dead space between the second protective layer BPL2 and the adhesive layer 510 may be reduced.

In embodiment, the first protective layer BPL1 may include the same material as the second protective layer BPL2. For example, the first protective layer BPL1 and the second protective layer BPL2 may have substantially one integral body. For example, the first protective layer BPL1 may be a part of the protective member BPL, and the second protective layer BPL2 may be a different part of the protective member BPL2. In an embodiment, the protective member BPL may include an acrylic resin, a urethane resin, or the like.

Referring to an embodiment of FIG. 6, a lateral side surface of the first protective layer BPL1 included in the display device 1000' may be inclined. For example, as shown in an embodiment of FIG. 6, an angle formed by a boundary line between the first protective layer BPL1 and the second protective layer BPL2 with the display panel 100 may be oblique and may have various different angles and is not limited to an angle of 90 degrees. The boundary line between the first protective layer BPL1 and the second protective layer BPL2 may be formed within a deformation that may occur due to a manufacturing process.

Figure 7:
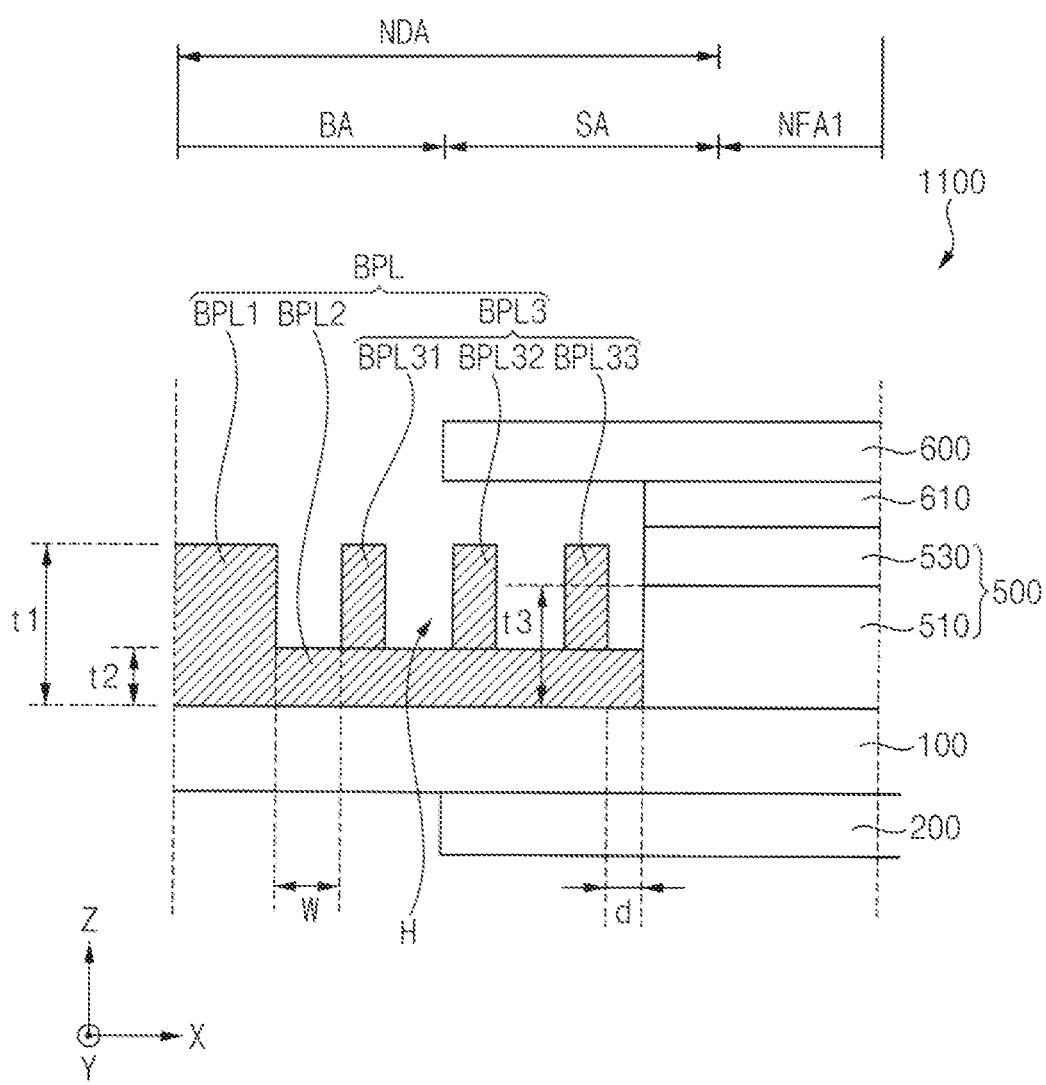
FIGS. 7 and 8 are enlarged cross-sectional views illustrating a portion of a display device according to embodiments of the present inventive concept.
Figure 8:
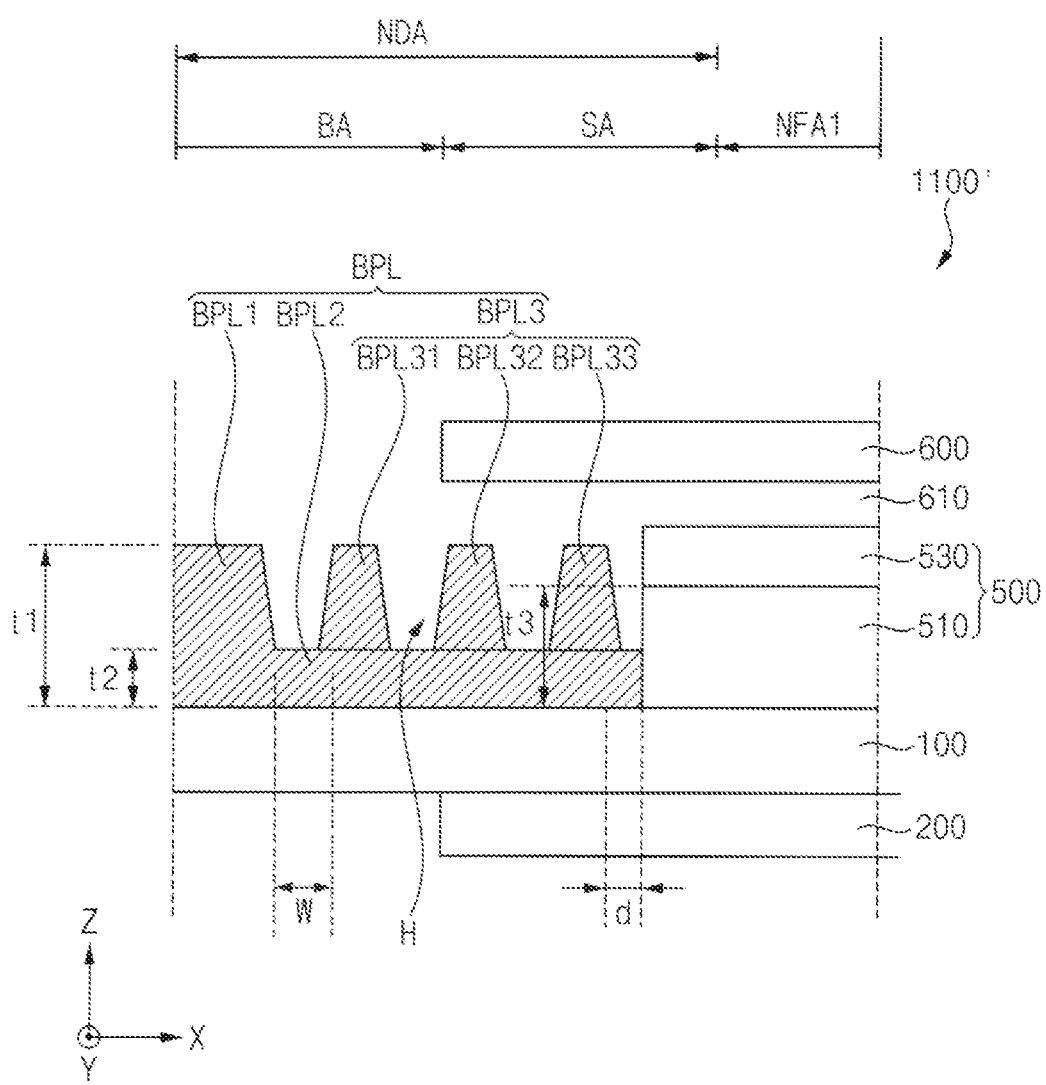

FIGS. 7 and 8 are enlarged cross-sectional views illustrating a portion of a display device according to embodiments of the present inventive concept. A display device according to an embodiment of FIG. 7 may be substantially the same as the display device described with reference to an embodiment of FIG. 5 except for the protective pattern. Accordingly, overlapping descriptions of similar or identical elements will be omitted for convenience of explanation.

Referring to FIG. 7, a display device 1100 according to an embodiment may include a display panel 100, an optical member 500, and a protective member BPL.

The optical member 500 may include an optical layer 530 and an adhesive layer 510.

The protective member BPL may include a first protective layer BPL1, a second protective layer BPL2 and a protective pattern BPL3 that protrudes upwardly from the second protective layer BPL2 (e.g., in the third direction Z), and is spaced apart from the optical layer 530 (e.g., in the first direction X). The protective pattern BPL3 may be spaced apart from the adhesive layer 510 (e.g., in the first direction X) and does not directly contact the adhesive layer 510.

In an embodiment, the first protective layer BPL1, the second protective layer BPL2, and the protective pattern BPL3 may include the same material. For example, in an embodiment, the first protective layer BPL1, the second protective layer BPL2 and the protective pattern BPL3 may have substantially one integral body. For example, the first protective layer BPL1 is a part of the protective member BPL, the second protective layer BPL2 is another part of the protective member BPL, and the protective pattern BPL3 is a still another part of the protective member BPL. In an embodiment, the protective member BPL may include an acrylic resin, a urethane resin, or the like.

In an embodiment, the protective pattern BPL3 may include a plurality of protrusions sequentially disposed in a direction from the first protective layer BPL1 toward the optical layer 530 (e.g., the first direction X). For example, the protective pattern BPL3 may include a first protrusion BPL31, a second protrusion BPL32, and a third protrusion BPL33. Although the protective pattern BPL3 is illustrated as including three protrusions BPL31, BPL32, and BPL33 in an embodiment of FIG. 7, the number of the protective patterns BPL3 is not limited thereto. For example, in an embodiment, the number of protective patterns BPL3 may be four or greater, such as greater than about 30.

The protective pattern BPL3 may define a groove H that is a spaced apart space between each of the first to third protrusions BPL31, BPL32, and BPL33.

In an embodiment, the width w of the space between the first protective layer BPL1 and the first protrusion BPL31 (e.g., length in the first direction X), the width of the space between the first protrusion BPL31 and the second protrusion BPL32 (e.g., length in the first direction X), and the width of the space between the second protrusion BPL32 and the third protrusion BPL33 (e.g., length in the first direction X) may be substantially the same. For example, in an embodiment, the width w between the first protective layer BPL1 and the first protrusion BPL31 may be about 3 micrometers. A distance d between a protrusion closest to the optical layer 530 (e.g., the third protrusion BPL33) and the optical layer 530 may be less than about 3 micrometers.

The protective pattern BPL3 may not be in direct contact with the optical layer 530. The protective member BPL may not be in direct contact the optical layer 530. When the optical layer 530 is moved by a repulsive force generated when the display device 1000 is unfolded or folded, the protective pattern BPL3 may buffer the repulsive force transmitted to the protective member BPL. Accordingly, even when the display device 1000 is unfolded or folded, the protective member BPL may prevent cracks in the display panel 100 and prevent the window 600 from lifting. Accordingly, the display quality of the display device 1000 may be increased.

Referring to an embodiment of FIG. 8, the plurality of protrusions of the protective pattern BPL3 included in the display device 1200' may each have a trapezoidal shape. However, embodiments of the present inventive concept are not necessarily limited thereto and the shape of the protective pattern BPL3 may vary. The shape of the protective pattern BPL3 may be formed in various ways within a deformation that may occur due to a manufacturing process.

Figure 9:
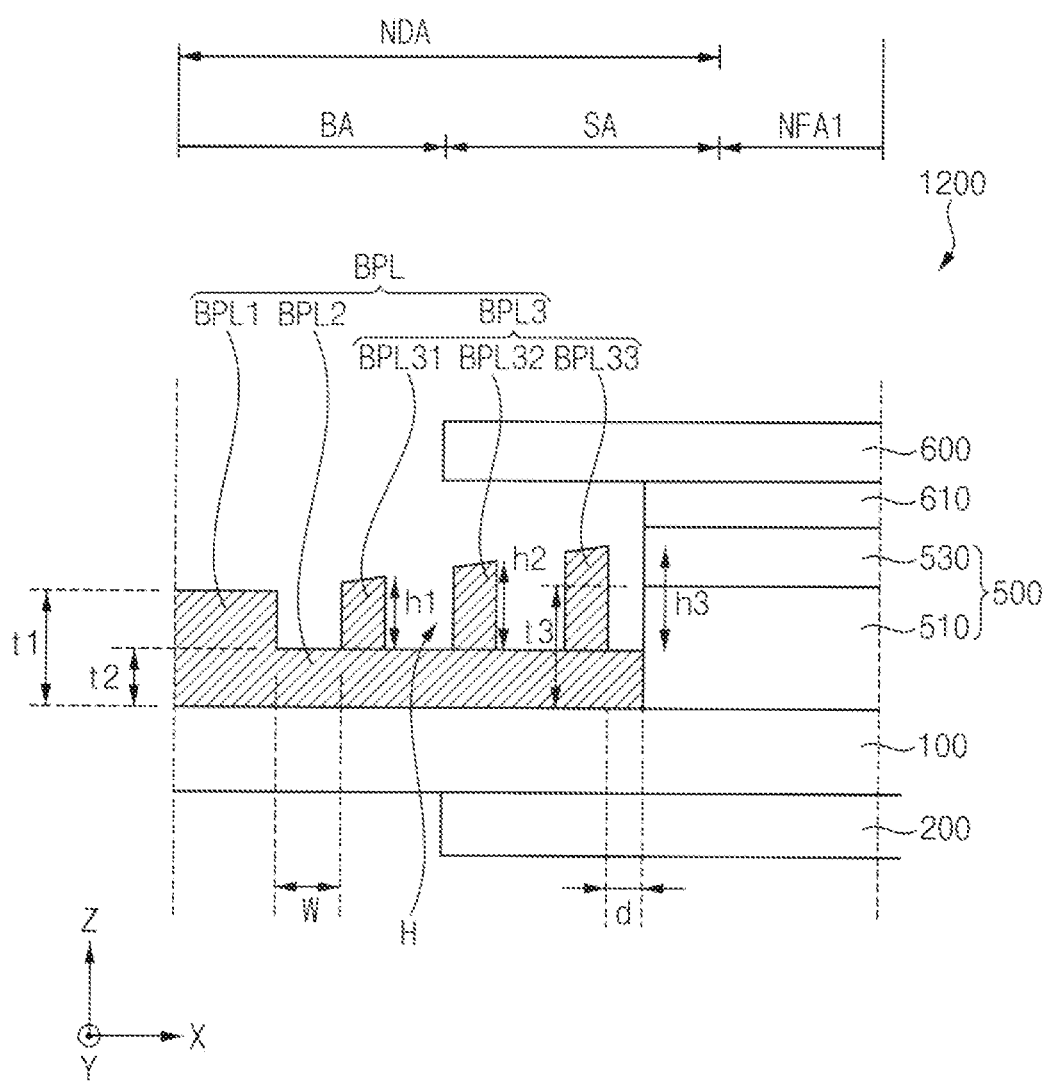
FIGS. 9 and 10 are enlarged cross-sectional views illustrating a portion of a display device according to embodiments of the present inventive concept.
Figure 10:
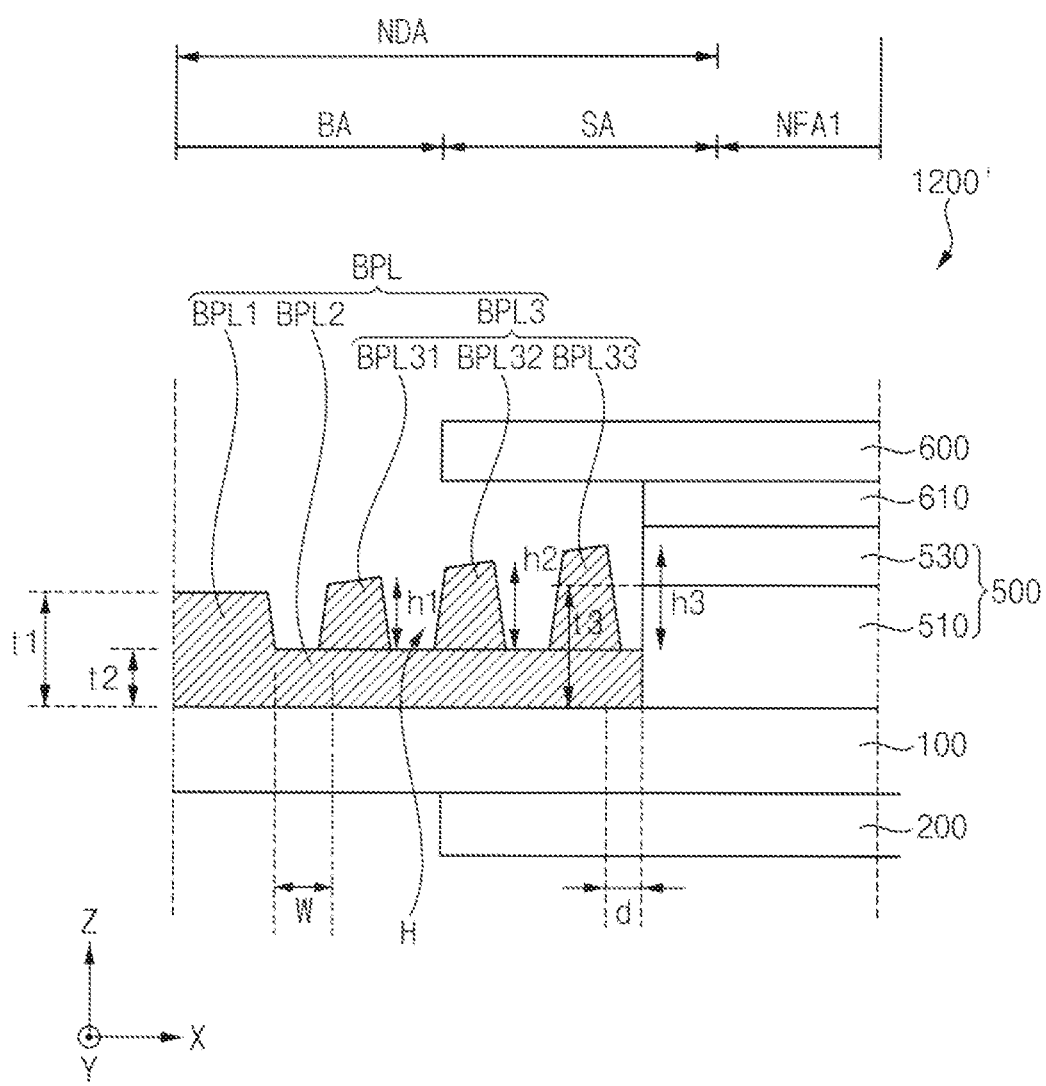

FIGS. 9 and 10 are enlarged cross-sectional views illustrating a portion of a display device according to embodiments of the present inventive concept. A display device according to embodiments of FIGS. 9 and 10 may be substantially the same as the display device described with reference to an embodiment of FIG. 7 except for the protective pattern. Accordingly, overlapping descriptions of similar or identical elements will be omitted for convenience of explanation.

Referring to FIG. 9, a display device 1200 according to an embodiment may include a display panel 100, an optical member 500, and a protective member BPL.

The protective member BPL may include a first protective layer BPL1 disposed on the display panel 100 in the first area BA and a second protective layer BPL2 disposed on the display panel 100 in the second area SA and a protective pattern BPL3 protruding upward from the second protective layer BPL2 (e.g., in the third direction Z) and spaced apart from the optical layer 530 (e.g. in the first direction X).

In an embodiment, a thickness h1 (e.g., length in the third direction Z) of the first protrusion BPL31, a thickness h2 of the second protrusion BPL32 and a thickness h3 of the third protrusion BPL33 may gradually increase as a distance increases from the first protective layer BPL1 and a distance decreases to the optical layer 530 (e.g., the first direction DR1). For example, the thickness h3 of the third protrusion BPL33 may be greater than the thickness h2 of the second protrusion BPL32, and the thickness h2 of the second protrusion BPL32 may be greater than the thickness h1 of the first protrusion BPL31.

As shown in an embodiment of FIG. 9, an upper surface of each of the first to third protrusions BPL31, BPL32, and BPL33 may be inclined. For example, each of the first to third protrusions BPL31, BPL32, and BPL33 may have a shape similar to a rectangle. However, embodiments of the present inventive concept are not necessarily limited thereto and the shape of each of the first to third protrusions BPL31, BPL32, and BPL33 may vary. The shape of each of the first to third protrusions BPL31, BPL32, and BPL33 may be formed in various ways within a deformation that may occur due to a manufacturing process. The thickness h1 of the first protrusion BPL31 may be the largest distance from a bottom surface of the first protrusion BPL31 to an upper surface of the first protrusion BPL31. However, embodiments of the present inventive concept are not necessarily limited thereto, and the thickness h1 of the first protrusion BPL31 may be an average of the shortest distance and the longest distance from the bottom surface of the first protrusion BPL31 to the upper surface of the first protrusion BPL31.

In an embodiment, a sum of the thickness of the protective pattern BPL3 and the second thickness t2 of the second protective layer BPL2 may be greater than or equal to the first thickness t1 of the first protective layer BPL1. For example, the sum of the thickness h1 of the first protrusion BPL31 and the second thickness t2 of the second protective layer BPL2 may be greater than the first thickness t1 of the first protective layer BPL1.

Referring to an embodiment of FIG. 10, the upper and lateral side surfaces of each of the first to third protrusions BPL31, BPL32 and BPL33 included in the display device 1200' may be inclined. For example, each of the first to third protrusions BPL31, BPL32, and BPL33 may have a shape similar to a trapezoid. However, embodiments of the present inventive concept are not necessarily limited thereto and the shape of each of the first to third protrusions BPL31, BPL32, and BPL33 may vary. The shape of each of the first to third protrusions BPL31, BPL32, and BPL33 may be formed in various ways within a deformation that may occur due to a manufacturing process.

Figure 11:
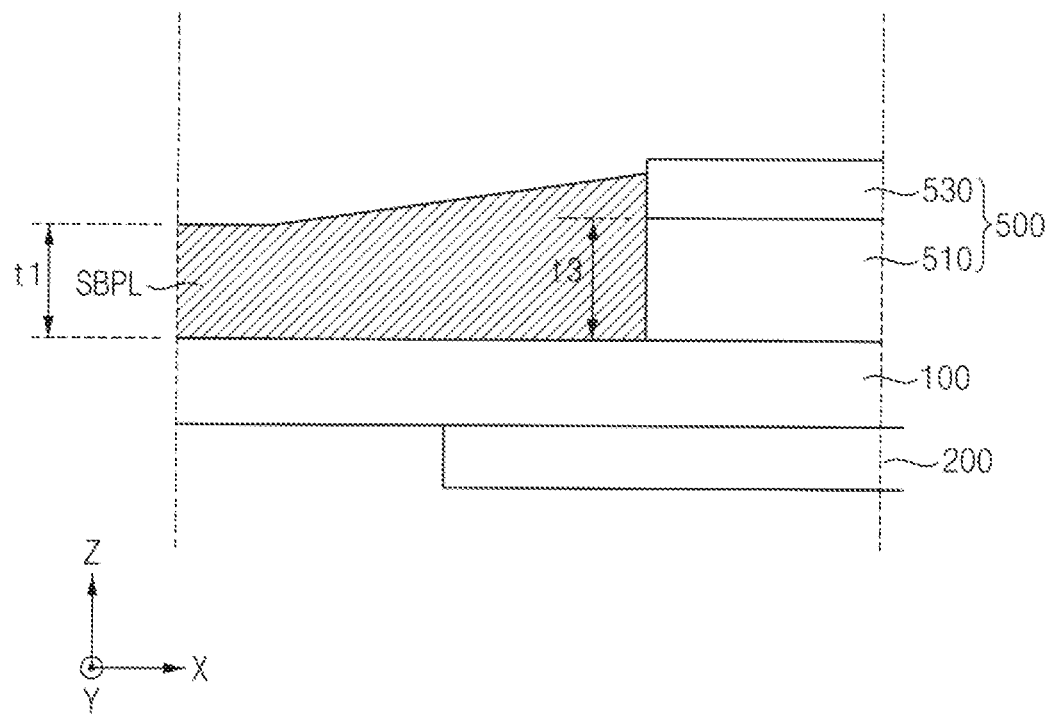
FIGS. 11, 12 and 13 are cross-sectional views illustrating a method of manufacturing a protective member included in the display device of FIG. 9 according to embodiments of the present inventive concept.
Figure 12:
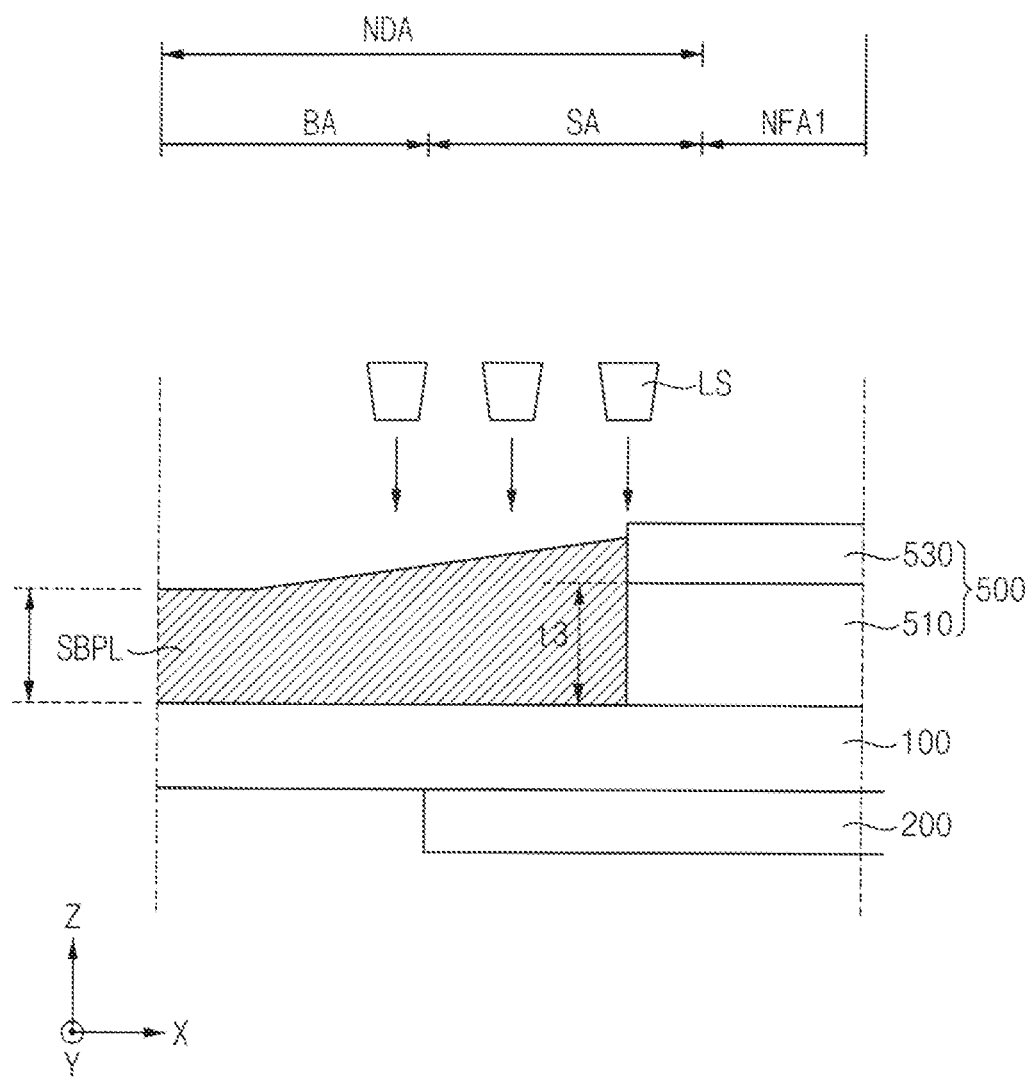
Figure 13:
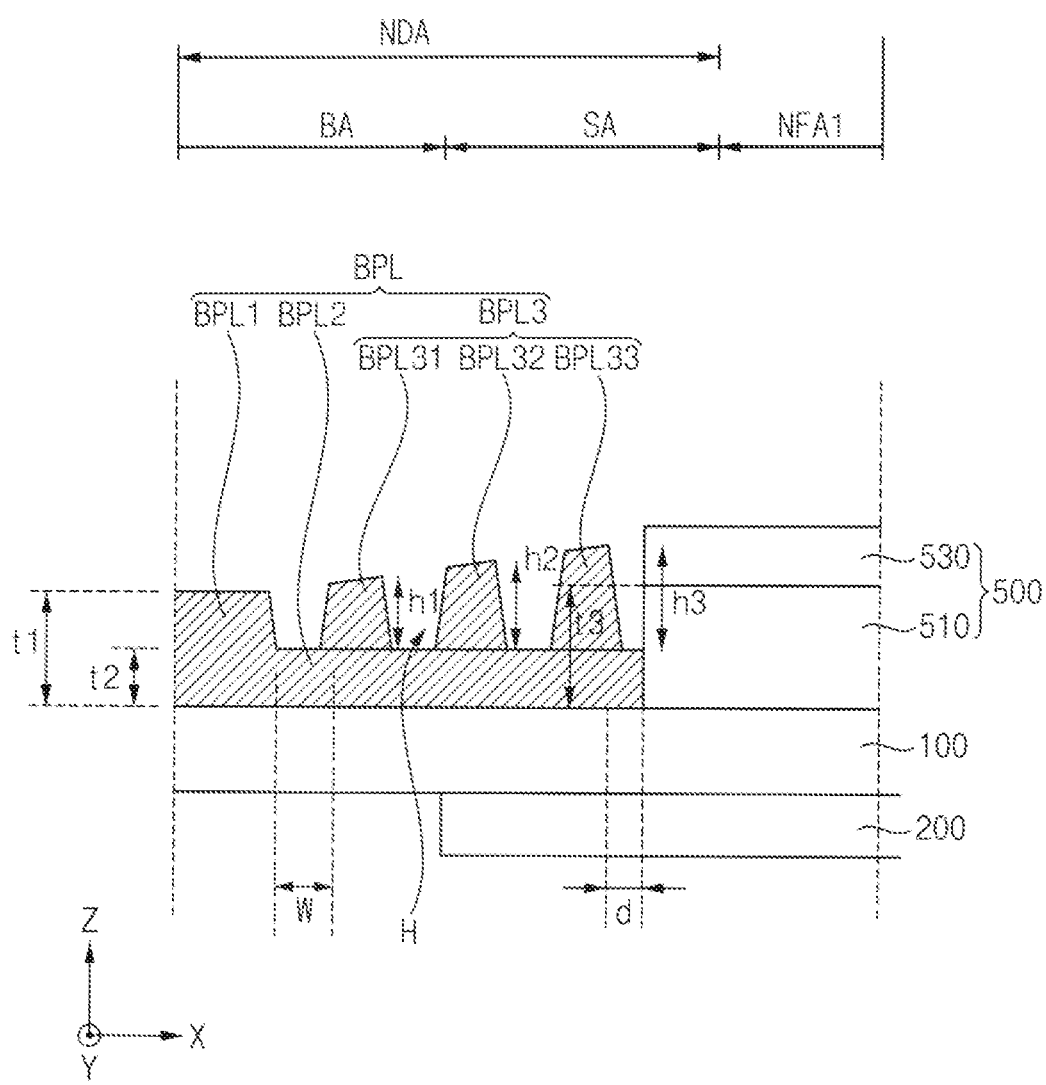

FIGS. 11, 12 and 13 are cross-sectional views illustrating a method of manufacturing a protective member included in the display device of FIG. 9.

Referring to an embodiment of FIG. 11, the optical member 500 may be formed of the display panel 100. The acrylic resin or the urethane-based resin may be disposed and coated on the display panel 100 on which the optical member 500 is not disposed. The acrylic resin or the urethane-based resin may rise along the optical member 500 in a portion adjacent to the optical member 500 by surface tension. However, embodiments of the present inventive concept are not necessarily limited thereto, and when the surface tension is relatively small, the upper surface of the acrylic resin or the urethane resin may be substantially flat. The preliminary protective member SBPL may be formed by curing an acrylic resin or a urethane-based resin.

Referring to FIG. 12, a light source LS may irradiate a laser. In an embodiment, a width of the laser may be about 3 micrometers. The laser may be irradiated to a boundary between the preliminary protective member SBPL and the optical member 500. Accordingly, a part of the laser may be irradiated to the optical member 500, and another part of the laser may be irradiated to the preliminary protective member SBPL. The light source LS may be moved to irradiate the laser to the preliminary protective member SBPL. The laser may penetrate a depth smaller than the entire thickness of the preliminary protective member SBPL.

Referring to embodiments of FIGS. 12 and 13, a groove H may be formed by irradiating the laser. For example, the protective member BPL may be formed by irradiating the laser to the preliminary protective member SBPL.

The width w (e.g., length in the first direction X) between the first protective layer BPL1 and the first protrusion BPL31, the width (e.g., length in the first direction X) between the first protrusion BPL31 and the second protrusion BPL32, and the width (e.g., length in the first direction X) between the second protrusion BPL32 and the third protrusion BPL32 may correspond to the laser. For example, the width w between the first protrusions BPL31 may be about 3 micrometers, which is the width of the laser. A distance d between a protrusion closest to the optical layer 530 (e.g., the third protrusion BPL33) and the optical layer 530 may correspond to a portion of the laser. For example, the distance d between the third protrusion BPL33 and the optical layer 530 may be less than about 3 micrometers.

An intensity of the laser may be reduced according to a depth through which the laser is transmitted through the preliminary protective member SBPL. Accordingly, a lateral side surface of the first protective layer BPL1 and a lateral side surface of the protective pattern BPL3 may be inclined. However, embodiments of the present inventive concept are not necessarily limited thereto. For example, in an embodiment, the laser intensity is kept constant and the lateral side surface of the first protective layer BPL1 and the side surface of the protective pattern BPL3 may not be inclined.

In an embodiment in which the laser is further irradiated to the protective pattern BPL3, the protective pattern BPL3 may be removed. In this embodiment, the protective member BPL may be formed to include the first protective layer BPL1 and the second protective layer BPL2 but not to include the protective pattern BPL3 as shown in embodiments of FIGS. 5-6.

The present inventive concept should not be construed as being limited to the embodiments set forth herein. Rather, these non-limiting embodiments are provided to fully convey the concept of the present inventive concept to those skilled in the art.

While the present inventive concept have been particularly shown and described with reference to non-limiting embodiments thereof, it will be understood by those of ordinary skill in the art that various changes in form and details may be made therein without departing from the spirit or scope of the present inventive concept.

What is claimed is:

1. A display device, comprising:
   a display panel including a display area, a first area spaced apart from the display area, and a second area disposed between the display area and the first area;
   an optical layer disposed on the display panel and extending from the display area to a portion of the second area; and
   a protective member including a first protective layer disposed on the display panel in the first area and a second protective layer disposed on the display panel in the second area and having a thickness less than a thickness of the first protective layer.

2. The display device of claim 1, wherein the protective member is spaced apart from the optical layer and does not directly contact the optical layer.

3. The display device of claim 1, further comprising:
   an adhesive layer disposed between the display panel and the optical layer.

4. The display device of claim 3, wherein the thickness of the second protective layer is less than a thickness of the adhesive layer.

5. The display device of claim 3, wherein the second protective layer directly contacts the adhesive layer.

6. The display device of claim 1, wherein the second protective layer directly contacts the first protective layer.

7. The display device of claim 1, wherein the second protective layer covers the second area and the second area does not include an exposed surface.

8. The display device of claim 1, wherein the second protective layer includes a same material as the first protective layer.

9. The display device of claim 8, wherein the protective member includes at least one material selected from a group consisting of an acrylic resin and a urethane-based resin.

10. A display device, comprising:
    a display panel including a display area, a first area spaced apart from the display area, and a second area disposed between the display area and the first area;
    an optical layer disposed on the display panel and extending from the display area to a portion of the second area; and
    a protective member including a first protective layer disposed on the display panel in the first area, a second protective layer disposed on the display panel in the second area and a protective pattern protruding upwardly from the second protective layer and spaced apart from the optical layer.

11. The display device of claim 10, wherein the protective pattern has a rectangular shape or a trapezoidal shape.

12. The display device of claim 10, wherein the protective pattern includes a first protrusion, a second protrusion, and a third protrusion sequentially arranged along a first direction from the first protective layer towards the optical layer.

13. The display device of claim 12, wherein a thickness of the second protrusion is greater than a thickness of the first protrusion and a thickness of the third protrusion is greater than the thickness of the second protrusion.

14. The display device of claim 10, wherein the protective member is spaced apart from the optical layer and does not directly contact the optical layer.

15. The display device of claim 10, further comprising an adhesive layer disposed between the display panel and the optical layer.

16. The display device of claim 15, wherein the second protective layer directly contacts the adhesive layer.

17. The display device of claim 15, wherein the protective pattern is spaced apart from the adhesive layer and does not directly contact the adhesive layer.

18. The display device of claim 10, wherein the second protective layer directly contacts the first protective layer.

19. The display device of claim 10, wherein the first protective layer includes a same material as the second protective layer.

20. The display device of claim 10, wherein a sum of a thickness of the protective pattern and a thickness of the second protective layer is greater than or equal to a thickness of the first protective layer.

* * * * *